US012309194B2

(12) United States Patent
Rose et al.

(10) Patent No.: US 12,309,194 B2
(45) Date of Patent: May 20, 2025

(54) SYSTEMS AND METHODS FOR EVASIVE RESILIENCY COUNTERMEASURES

(71) Applicant: Nightwing Group, LLC, New York, NY (US)

(72) Inventors: Daniel Rose, Austin, TX (US); Torsten Staab, Herndon, VA (US)

(73) Assignee: NIGHTWING GROUP, LLC, New York, NY (US)

( * ) Notice: Subject to any disclaimer, the term of this patent is extended or adjusted under 35 U.S.C. 154(b) by 184 days.

(21) Appl. No.: 17/499,161

(22) Filed: Oct. 12, 2021

(65) Prior Publication Data

US 2022/0191217 A1 Jun. 16, 2022

Related U.S. Application Data

(60) Provisional application No. 63/125,491, filed on Dec. 15, 2020.

(51) Int. Cl.
| | | |
|---|---|---|
| G06F 21/00 | (2013.01) | |
| G06F 21/60 | (2013.01) | |
| H04L 9/40 | (2022.01) | |

(52) U.S. Cl.
CPC .......... *H04L 63/145* (2013.01); *G06F 21/602* (2013.01); *H04L 63/1416* (2013.01); *H04L 63/1458* (2013.01); *H04L 2463/141* (2013.01)

(58) Field of Classification Search
None
See application file for complete search history.

(56) References Cited

U.S. PATENT DOCUMENTS

| | | | | |
|---|---|---|---|---|
| 7,757,023 | B1 * | 7/2010 | Ranganathan | ...... G06F 13/4022 |
| | | | | 709/225 |
| 8,060,935 | B2 * | 11/2011 | Kingsford | ............. G06F 21/552 |
| | | | | 713/176 |
| 8,612,398 | B2 * | 12/2013 | Jarrett | ....................... G06F 8/71 |
| | | | | 714/15 |
| 9,047,441 | B2 * | 6/2015 | Xie | ........................ G06F 21/53 |
| 9,130,741 | B2 | 9/2015 | Nakano et al. | |
| 10,129,290 | B2 * | 11/2018 | Thomas | .............. H04L 63/1441 |
| 10,812,513 | B1 * | 10/2020 | Manni | .................... G06F 21/554 |

(Continued)

FOREIGN PATENT DOCUMENTS

WO WO2015051181 A1 4/2015

OTHER PUBLICATIONS

PCT International Search Report and Written Opinion dated Jan. 20, 2022 for International Application No. PCT/US21/54962; 204 Pages.

(Continued)

*Primary Examiner* — Maung T Lwin
(74) *Attorney, Agent, or Firm* — Cowan, Liebowitz & Latman, P.C.; Mark Montague

(57) ABSTRACT

Evasive resiliency countermeasures techniques that include: implementing a cyber asset in a network element of a plurality of network elements, monitoring operations of the network; detecting an adverse event within the network; in response to detecting the adverse event, removing an availability of the cyber asset at the network element; determining when the adverse event has ended; and, in response to determining that the adverse event has ended, restoring the availability of the cyber asset at the network element.

16 Claims, 3 Drawing Sheets

(56) References Cited

U.S. PATENT DOCUMENTS

| | | | | |
|---|---|---|---|---|
| 11,347,843 | B2* | 5/2022 | Suwad | G06F 21/52 |
| 2011/0197279 | A1* | 8/2011 | Ueoka | G06F 21/568 |
| | | | | 726/24 |
| 2012/0072989 | A1* | 3/2012 | Sakai | G06F 21/567 |
| | | | | 726/24 |
| 2014/0317745 | A1* | 10/2014 | Kolbitsch | G06F 21/566 |
| | | | | 726/24 |
| 2016/0092682 | A1* | 3/2016 | Adams | G06F 11/3688 |
| | | | | 726/23 |
| 2017/0310703 | A1 | 10/2017 | Ackerman et al. | |
| 2018/0359272 | A1 | 12/2018 | Mizrachi et al. | |
| 2019/0138727 | A1* | 5/2019 | Dontov | G06F 11/1464 |
| 2019/0238570 | A1 | 8/2019 | Mehner | |
| 2020/0329060 | A1* | 10/2020 | Bergström | G06F 21/53 |

OTHER PUBLICATIONS

International Preliminary Report on Patentability in Application No. PCT/US2022/054962 dated Jun. 29, 2023, 8 pages.

\* cited by examiner

SYSTEMS AND METHODS FOR EVASIVE RESILIENCY COUNTERMEASURES

REFERENCE TO RELATED

This application claims priority to and the benefit of U.S. Provisional Patent Application No. 63/125,491, filed on Dec. 15, 2020, entitled "EVASIVE RESILIENCY COUNTERMEASURES," the entire contents of which are incorporated herein by reference.

TECHNICAL FIELD

This application relates generally to computer systems and, more particularly, to computer system and data network security techniques.

BACKGROUND

Computer systems and networks are commonly used in many environments today to enable efficient access to and the distribution of information. The industry currently leverages multiple security technologies (e.g., network firewalls, anti-virus monitors, and network traffic introspection) to protect the edge of enterprise and private networks and their computing devices from exploitation as it happens. For a network or computer system to be resilient to or recover from an attack, the network or system must maintain or reconstruct the data, programs, services, and operating system components that were affected by a cyber attack. While various conventional computing systems and processors include fault tolerance features such as redundant processor cores or duplicate fail-over components, there remains a need for improved processor resiliency and failure recovery, especially with respect to processors that are not readily or cost-effectively accessible to system operators.

SUMMARY

The application, in various implementations, addresses deficiencies associated with existing protection and recovery techniques in response to cyber attacks. The application includes exemplary devices, systems and methods for providing cyber resiliency that depends on a system's data, program, operating system, and/or enterprise device functionality. A system's ability to protect or reconstruct these core pieces of modern computing in the face of impending or in-progress hacking attempts helps determine the degree that a system is resilient to attack.

This application describes exemplary computing systems and/or processors, devices, and methods that provide resiliency in network and/or computer environments that may be susceptible to hacking, security breaches, computer viruses, trojan horses, spyware, malware, and/or any other various types of network intrusions and/or cyber attacks. In various implementations, the systems and methods described herein provide evasive countermeasures including, without limitation: 1) Breaking up critical cyber assets (e.g., data, programs, applications, services, databases, operating system components, and/or data interfaces) into randomized chunks (which may be encrypted) and hiding them locally and remotely; 2) Preemptively migrating or taking mission critical services offline or dark to reduce or eliminate attack surfaces; 3) Utilizing multiple, "safe", hardware or virtual resources and modalities to store these randomized chunks (which may be encrypted). Such resources may be local or remote (e.g., a data center, cloud, or multiple-clouds); and 4) Combining cyber enterprise monitoring system with evasive protection algorithm.

In one aspect, a system for providing evasive resiliency countermeasures includes a data network having a plurality of network elements. The system includes a first network element arranged to: i) monitor operations of the data network, ii) detect an adverse event within the data network where the adverse event may include a data network intrusion, malicious insider, denial-of-service attack, presence of a virus and/or a trojan horse, actions of the virus and/or the trojan horse, presence of malware, actions of the malware, and/or unauthorized activities, iii) in response to detecting the adverse event, issue a first notification indicating a detection of the adverse event, iv) determine when the adverse event has ended, and v) issue a second notification indicating that the adverse event has ended. The system also includes a second network element arranged to: i) implement a cyber asset where the cyber asset may include a data file, database, application, service, data interface, and/or an operating system component. ii) receive the first notice, iii) in response to receiving the first notification, remove an availability of the cyber asset at the second network element, and v) in response to receiving the second notification indicating that the adverse event has ended, restore the availability of the cyber asset at the second network element. The ending of an adverse event may be determined automatically by a security application and/or server using, for example, using AI and/or machine learning to detect when normal operations of the network has resumed. The ending of an adverse event may be determine via, for example, a manual input and/or indication from to the security application and/or server by a network administrator via a user interface.

In some implementations, removing the availability of the cyber asset includes moving one or more portions of the cyber asset from the second network element to one or more other network elements of the plurality of network elements. The one or more portions of the cyber asset may include one or more chunks of data associated with the cyber asset. The second network element may encrypt the one or more portions of the cyber asset. The one or more other network elements may be located remotely from the data network, including outside of a firewall associated with the data network.

In certain implementations, removing the availability of the cyber asset includes deactivating or shutting down a partial or entire functionality of second network element. Removing the availability of the cyber asset may include archiving data associated with the cyber asset using a removable local media or a networked storage system or service. The second network element may include a server operating within the network. The first network element may include a security monitoring server. A server may include a virtualized server operating within or among one or more network elements.

In another aspect, a method for providing evasive resiliency countermeasures in a data network includes: implementing a cyber asset in a network element of a plurality of network elements, where the cyber asset includes a data file, database, application, service, data interface, and/or an operating system component, and where a network element includes a computer, server, database, removable storage device, remote storage service, router, firewall, internal computing device, removable computing component, and/or a mobile computing device; monitoring operations of the data network; detecting an adverse event within the data network, where the adverse event includes a data network intrusion, malicious insider, denial-of-service attack, presence of a virus and/or trojan horse, actions of the virus and/or the trojan horse, presence of malware, actions of the malware, and unauthorized activities; in response to detecting the adverse event, removing an availability of the cyber asset at the network element; detecting when the adverse event has ended; and in response to determining that the adverse event has ended, restoring the availability of the cyber asset at the network element.

Any two or more of the features described in this specification, including in this summary section, may be combined to form implementations not specifically described in this specification.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

The application, in various aspects, addresses deficiencies associated with computer and/or network security techniques. The application includes exemplary devices, systems and methods for evasive resiliency countermeasures against cyber attacks and system recovery from such cyber attacks.

Cyber protection systems and methods as described herein that have the ability to coordinate detection of network intrusions and distribute cyber assets (e.g., data and/or services) among enterprise devices and take evasive measures in the face of an impending attack. Potential options include: 1) breaking up critical data files into random file chunks distributed on the local data drives using a proprietary algorithm and then placing key local cyber system components that handle protection of the system into a temporary dormant (non-running) state. In this way, the protected data would be difficult to find and would have to be reconstructed properly before a brute force or similar attack could begin against the encrypted data; and 2) Instead of distributing these file chunks locally, the cyber system can identify other devices, hardware, or virtual resources in the enterprise that are safe from attack where this data can be hidden. This process could apply to programs as well or key operating system components. In addition, important pieces of the cyber protection system could be moved to other enterprise devices for safe keeping while the system is dormant.

Figure 1:
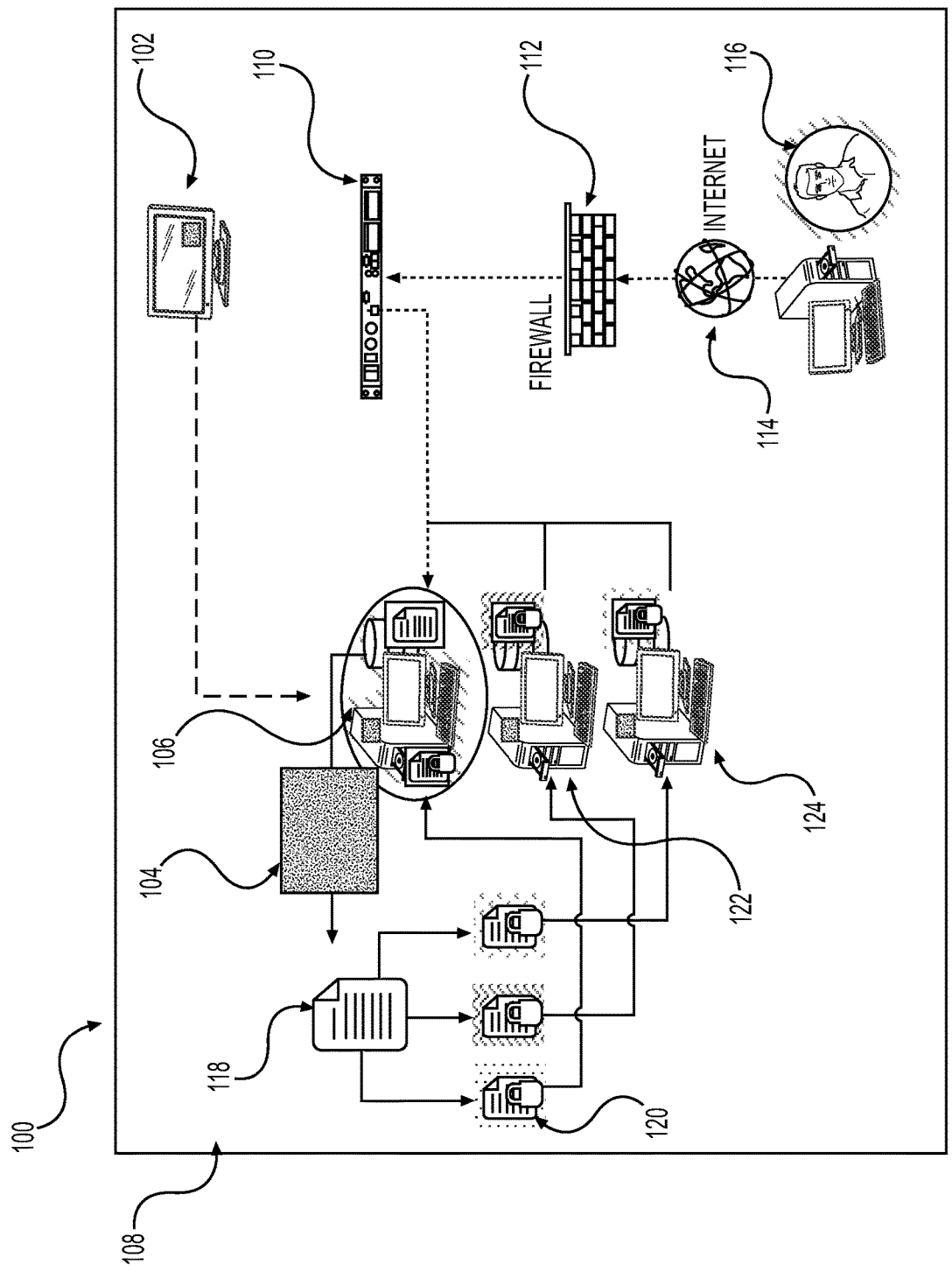
FIG. 1 is a block diagram of an exemplary evasive resiliency countermeasures system.

FIG. 1 is a block diagram of an exemplary evasive resiliency countermeasure system 100. System 100 includes a network 108 that has multiple network elements 102, 106, 122, and 124. Security monitoring server 102, e.g., a first network element, may be arranged to: i) monitor operations of the network 108, ii) detect an adverse event within the network 108, iii) in response to detecting the adverse event, issue a first notification (e.g., an alert and/or message via network 108) indicating a detection of the adverse event, iv) determine when the adverse event has ended, and v) issue a second notification indicating that the adverse event has ended. The ending of an adverse event may be determined automatically by a security application or service 104 and/or server 102 using, for example, AI and/or ML to detect when normal operations of the network has resumed. The ending of an adverse event may be determined via, for example, a manual input and/or indication to security application 104 and/or server 102 by a network administrator via a user interface.

System 100 also includes a server 106, e.g., second network element, referred to as an attack target, that is arranged to: i) implement a cyber asset 118, ii) receive the first notification and/or alert, iii) in response to receiving the first notification, remove an availability of the cyber asset 118 at server 106, and v) in response to receiving the second notification indicating that the adverse event has ended, restore the availability of cyber asset 118 at server 106. The first and/or second notification may be an alert and/or message sent directly from server 102 to a network element that is an attack target. The first and/or second notification may be an alert that is broadcast to multiple network elements that includes an indication of which network element(s) is/are attack targets.

Server 106 may be arranged to store and/or implement cyber asset 118. The cyber asset 118 may include, without limitation, a data file, database, application, service, data interface, program, executable code, and/or an operating system component. Any network element of network 108 may include a computer, server, database, removable storage device, router such as router 110, firewall such as firewall 112, internal computing device, a removable computing device, and/or a mobile computing device. Security monitoring server 102 may include an evasion and resiliency service 104. Server 102 and/or service 104 may be arranged to monitor operations of network 108 and/or detect an adverse event within network 108 that may be launched by an adversary 116.

The adverse event may include a network intrusion, malicious insider, denial-of-service attack, presence of a virus and/or trojan horse, actions of the virus and/or the trojan horse, presence of malware, actions of the malware, and/or unauthorized activities. The ending of an adverse event may be determined automatically by a security application or service 104 and/or server 102 using, for example, AI and/or ML to detect when normal operations of the network has resumed. The ending of an adverse event may be determined via, for example, a manual input and/or indication to the resiliency service 104 and/or server 102 by a network administrator via a user interface. Data means any form of information stored within a computer readable medium such as a storage medium, memory, and/or firmware of a computer system, database, and/or network. For example, data may include digital information from a database, network sensors, data file, and the like. Data may include source code, object code, and/or executable code such as processor instructions and/or programs stored within a computer readable medium that may be used by a processor to execute functions, operations, programs, or applications of a computing system.

In an alternate implementation, in response to detecting the adverse event, server 102 and/or service 104 may remove an availability of a first cyber asset at, for example, server 106. Server 102 and/or service 104 may continue to monitor network 108 operations to detect when the adverse event has ended. In response to detecting that the adverse event has ended, Server 102 and/or service 104 may restore the availability of the cyber asset at server 106 or any other server or servers such as server 122 and 124.

In some implementations, removing the availability of the cyber asset 118 includes moving one or more portions 120 of cyber asset 118 from server 106 to one or more other network elements such as servers 122 and 124. The one or more portions 120 of cyber asset 118 may include one or more chunks of data associated with the cyber asset 118. Server 106 and/or service 104 may encrypt the one or more portions 120 of the cyber asset 118. Other servers 102, 122 and 124, and/or other network elements such as router 110 and/or firewall 112, may perform the functions described with respect to server 106 and/or implement functions associated with service 104, either alone or in combination with server 106. Certain network elements may be located remotely from the network 108 including, for example, outside of a firewall 112 and within the Internet 114.

In some implementations, when server 106 removes the availability of cyber asset 118, the removal may include deactivating or shutting down a partial or entire functionality of a network element such as server 106. Removing the availability of the cyber asset 118 may include archiving data associated with the cyber asset 118 in a removable media.

Figure 2:
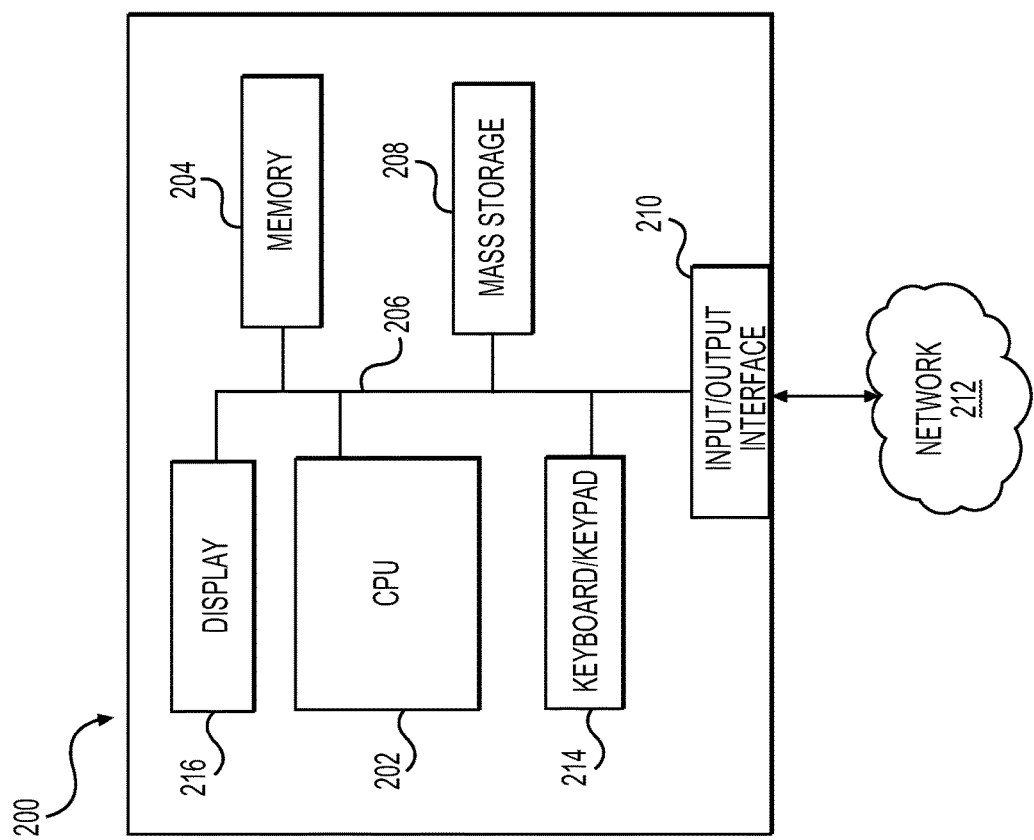
FIG. 2 is a block diagram of a computer system architecture for implementing aspects of the evasive resiliency countermeasures systems and techniques.

FIG. 2 includes a block diagram of a computer system 200 for performing the functions of a computer such as for any of the network elements 102, 106, 110, 112, 122, and 124 of FIG. 1. The exemplary computer system 200 includes a central processing unit (CPU) 202, a memory 204, and an interconnect bus 206. The CPU 202 may include a single microprocessor or a plurality of microprocessors for configuring computer system 200 as a multi-processor system. The memory 204 illustratively includes a main memory and a read only memory. The computer 200 also includes the mass storage device 208 having, for example, various disk drives, tape drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives or solid state memory, for storing data and/or instructions for use by the CPU 202. At least one component of the mass storage system 208, preferably in the form of a disk drive, solid state, or tape drive, stores the database used for monitoring network 108 operations via server 102 and supporting evasive resiliency countermeasures provided by server 106 and/or service 104. Server 102, server 106 and/or service 104 may implement artificial intelligence (AI) and/or machine learning (ML) engines that implement neural networks and/or Deep-learning architectures such as deep neural networks, deep belief networks, recurrent neural networks and convolutional neural networks to detect adverse events and/or dynamically implement countermeasures respectively. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200. In some implementations, computer 200 and/or service 104 may perform evasive resiliency countermeasures for multiple cyber asserts located at one or more network elements concurrently.

Network 212 may include a wireless, Adhoc, and/or mobile network, supporting multiple computing servers implementation a cloud computing environment. Various network 108 sensors may be communicatively connected via network 212 to provide status data to, for example, server 102, server 106 and/or service 104 regarding a security status of network 108.

The computer system 200 may also include one or more input/output interfaces for communications, shown by way of example, as interface 210 and/or transceiver for data communications via the network 212. The data interface 210 may be a modem, an Ethernet card or any other suitable data communications device. To provide the functions of a computer 102, the data interface 210 may provide a relatively high-speed link to a network 212, such as an intranet, or the Internet, either directly or through another external interface. The communication link to the network 212 may be, for example, optical, wired, or wireless (e.g., via satellite or cellular network). Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216 and keyboard 214 or the like serving as a local user interface for programming and/or data retrieval purposes. The display 216 and/or display 120 may include a touch screen capability to enable users to interface with the system 200 by touching portions of the surface of the display 216. Remote operations personnel may interact with the system 200 for controlling and/or programming the system from remote terminal devices via the network 212.

The computer system 200 may run a variety of application programs or services and store associated data in a database of mass storage system 208. One or more such applications may include service 104 to perform various evasive countermeasures in response to a detected cyber threat to network 108 and/or one of more cyber assets.

The components contained in the computer system 200 may enable the computer system to be used as a server, workstation, personal computer, network terminal, mobile computing device, and the like. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes UNIX workstation, a Windows workstation, a LINUX workstation, or other type of workstation. Other operating systems may be employed such as, without limitation, Windows, MAC OS, and LINUX. In some aspects, the software can optionally be implemented as a C language computer program, or a computer program written in any high level language including, without limitation, JavaScript, Java, CSS, Python, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 200 may use a digital signal processor (DSP).

As stated previously, the mass storage 208 may include a database. The database may be any suitable database system, including the commercially available Microsoft Access database, and can be a local or distributed database system. A database system may implement Sybase and/or an SQL Server. The database may be supported by any suitable persistent data memory, such as a hard disk drive, RAID system, tape drive system, floppy diskette, or any other suitable system. The system 200 may include a database that is integrated with the system 200, however, it is understood that, in other implementations, the database and mass storage 208 can be an external element.

In certain implementations, the system 200 may include an Internet browser program and/or to be configured to operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

The computer system 200 may include a web server running a Web 2.0 application or the like. Web applications running on system 200 may use server-side dynamic content generation mechanisms such, without limitation, Java servlets, CGI, PHP, or ASP. In certain embodiments, mashed content may be generated by a web browser running, for example, client-side scripting including, without limitation, JavaScript and/or applets on a wireless device.

In certain implementations, system 200 and/or controller 118 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

The system 200 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, and any like public key or private key based schemes.

Figure 3:
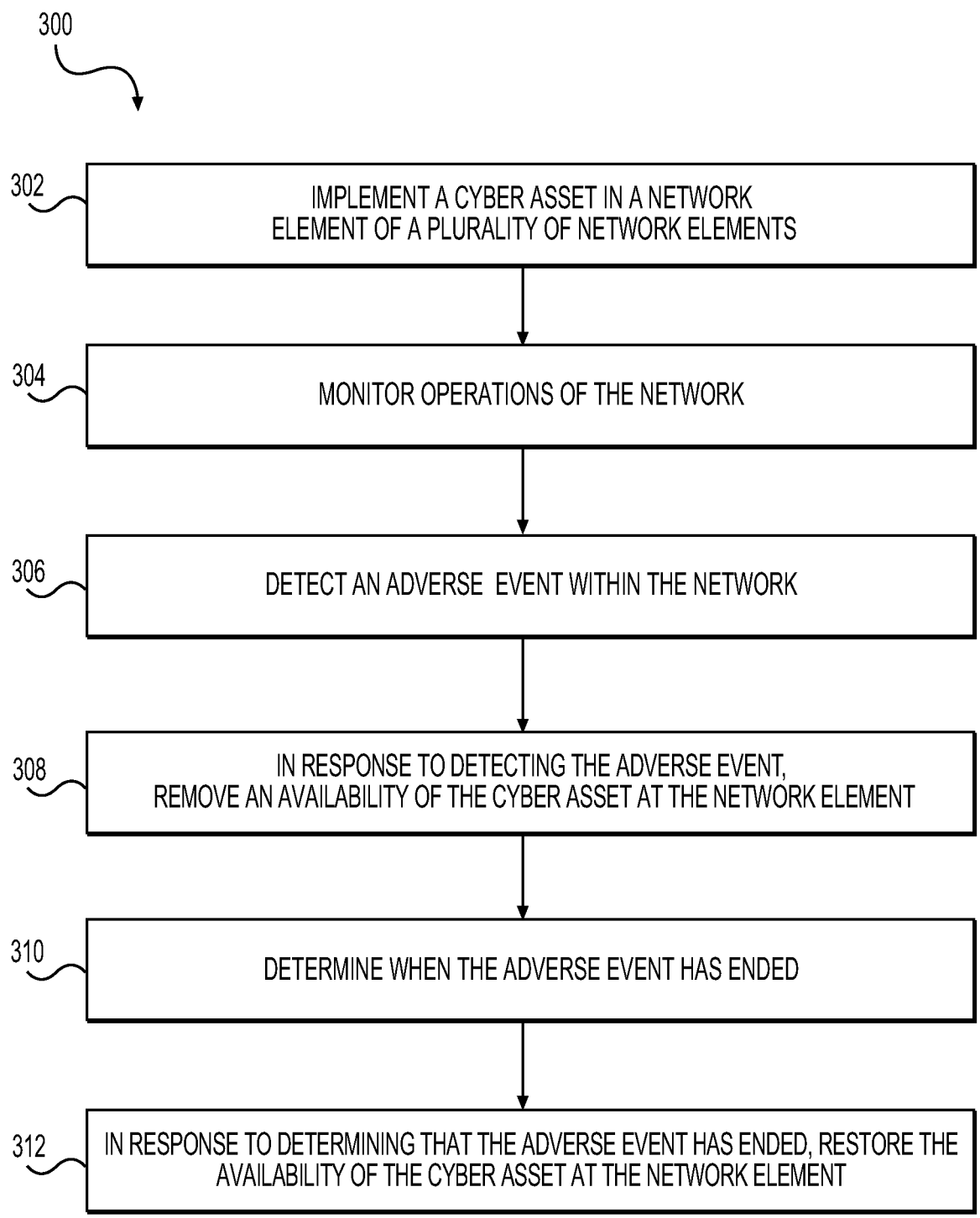
FIG. 3 is a process for preforming evasive resiliency countermeasures.

FIG. 3 is a process 300 for performing evasive resiliency countermeasures. Process 300 includes: implementing a cyber asset 118 in a network element such as server 106 of a plurality of network elements, where the cyber asset 118 includes a data file, database, application, service, data interface, and/or an operating system component. A network element may include a computer, server, database, removable storage device, router, firewall, internal computing device, removable computing component, and/or a mobile computing device (Step 302); monitoring operations of the network 108 (Step 304); detecting an adverse event within the data network 108, where the adverse event may include a data network intrusion, malicious insider, denial-of-service attack, presence of a virus and/or trojan horse, actions of the virus and/or the trojan horse, presence of malware, actions of the malware, and/or unauthorized activities (Step 306); in response to detecting the adverse event, removing an availability of the cyber asset 118 at the network element such as server 106 (Step 308); detecting when the adverse event has ended (Step 310); and in response to detecting that the adverse event has ended, restoring the availability of the cyber asset 118 at the network element such as server 106 (Step 312).

It will be apparent to those of ordinary skill in the art that certain aspects involved in the operation of server 102, server 106, and/or service 104, or other devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Elements or steps of different implementations described may be combined to form other implementations not specifically set forth previously. Elements or steps may be left out of the systems or processes described previously without adversely affecting their operation or the operation of the system in general. Furthermore, various separate elements or steps may be combined into one or more individual elements or steps to perform the functions described in this specification.

Other implementations not specifically described in this specification are also within the scope of the following claims.

What is claimed is:

1. A system for performing evasive resiliency countermeasures:
    a network including a plurality of network elements;
    the plurality of network elements including at least a first network element and a second network element;
    the first network element is configured to: i) monitor operations of the network, ii) detect an adverse event within the network, wherein the adverse event includes at least one of a network intrusion, malicious insider, denial-of-service attack, presence of at least one of a virus and a trojan horse, actions of at least one of the virus and the trojan horse, presence of malware, actions of the malware, and unauthorized activities, iii) in response to detecting the adverse event, issue a first notification, by the first network element, either directly or indirectly to at least one element on the network in communication with the first network element, indicating a detection of the adverse event, iv) determining when the adverse event has ended, and v) in response to determining that the adverse event has ended, issue a second notification, by the first network element, indicating that the adverse event has ended; and
    the second network element is configured to: i) implement a cyber asset at the second network element, wherein the cyber asset includes at least one of a data file, database, application, service, data interface, and an operating system component, ii) receive the first notification, and iii) in response to receiving the first notification, migrating one or more portions of the cyber asset that is affected by the adverse event, including at least a portion of executable code of the cyber asset, from the second network element to one or more other network elements different from at least the second network element, wherein the second network element breaks up portions of the migrated cyber asset into randomized file chunks, encrypts the randomized file chunks, and migrates the encrypted randomized file chunks to said one or more other network elements.

2. The system of claim 1, wherein the one or more portions of the cyber asset include one or more chunks of data in addition to said at least a portion of executable code of the cyber asset.

3. The system of claim 1, wherein said one or more other network elements are remotely located from the second network element.

4. The system of claim 3, wherein locating remotely includes locating the one or more other elements outside of a firewall associated with the network.

5. The system of claim 1, wherein removing the availability of the cyber asset includes deactivating or shutting down a partial functionality of the second network element to limit access to the cyber asset.

6. The system of claim 1, wherein removing the availability of the cyber asset includes archiving migrated portions of the cyber asset utilizing a removable media or a remote storage system or service.

7. The system of claim 1, wherein the second network element includes a server operating within the network.

8. The system of claim 1, wherein the first network element includes a security monitoring server.

9. A method for performing evasive resiliency countermeasures in a network comprising:
implementing a cyber asset m a first network element of a plurality of network elements, wherein the cyber asset includes at least one of a data file, database, application, service, data interface, and an operating system component, and wherein a network element includes at least one of a computer, server, database, removable storage device, remote storage system or service, router, firewall, internal computing device, removable computing component, and a mobile computing device;
monitoring, by the first network element, operations of the network;
detecting, using the first network element, an adverse event within the network, wherein the adverse event includes at least one of a network intrusion, malicious insider, denial-of-service attack, presence of at least one of a virus and trojan horse, actions of at least one of the virus or the trojan horse, presence of malware, actions of the malware, and unauthorized activities; and
in response to detecting the adverse event, migrating one or more portions of the cyber asset that is affected by the adverse event, including at least a portion of executable code of the cyber asset, from the second network element to one or more other network elements different from at least the second network element by breaking up portions of the cyber asset into randomized file chunks, encrypting the randomized file chunks, and migrating the encrypted randomized file chunks to said one or more other network elements.

10. The method of claim 9, wherein the one or more portions of the cyber asset include one or more chunks of data in addition to said at least a portion of executable code of the cyber asset.

11. The method of claim 9, wherein said one or more other network elements are remotely located from the second network element.

12. The method of claim 11, wherein locating remotely includes locating the one or more other network elements outside of a firewall of the network.

13. The method of claim 9, wherein removing the availability of the cyber asset includes deactivating or shutting down a partial functionality of the second network element to limit access to the cyber asset.

14. The method of claim 9, wherein removing the availability of the cyber asset includes archiving migrated portions of the cyber asset utilizing a removable media or a remote storage system or service.

15. The method of claim 9, wherein the network element includes a server operating within the network.

16. A non-transient computer readable medium containing program instructions for causing a computer to perform evasive resiliency countermeasures in a network comprising the method of:
implementing a cyber asset in a first network element of a plurality of network elements, wherein the cyber asset includes at least one of a data file, database, application, service, data interface, and an operating system component, and wherein a network element includes at least one of a computer, server, database, removable storage device, storage system or service, router, firewall, internal computing device, a removable computing component, and a mobile computing device;
monitoring, by the first network element, operations of the network;
detecting, using the first network element, an adverse event within the network, wherein the adverse event includes at least one of a network intrusion, malicious insider, denial-of-service attack, presence of at least one of a virus and trojan horse, actions of at least one of the virus and the trojan horse, presence of malware, actions of the malware, and unauthorized activities;
in response to detecting the adverse event, migrating one or more portions of the cyber asset that is affected by the adverse event, including at least a portion of executable code of the cyber asset, from the second network element to one or more other network elements different from at least the second network element by breaking up portions of the cyber asset into randomized file chunks, encrypting the randomized file chunks, and migrating the encrypted randomized file chunks to said one or more other network elements.

\* \* \* \* \*